United States Patent
Imamura et al.

(10) Patent No.: US 9,174,288 B2
(45) Date of Patent: Nov. 3, 2015

(54) SLIDABLE MITER SAW WITH GUIDING MECHANISM

(71) Applicant: Hitachi Koki Co., Ltd., Tokyo (JP)

(72) Inventors: Ryuichi Imamura, Ibaraki (JP); Shigeharu Ushiwata, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 399 days.

(21) Appl. No.: 13/685,350

(22) Filed: Nov. 26, 2012

(65) Prior Publication Data

US 2013/0133495 A1 May 30, 2013

(30) Foreign Application Priority Data

Nov. 29, 2011 (JP) ................................ 2011-260249

(51) Int. Cl.
- B23D 45/04 (2006.01)
- B23D 45/02 (2006.01)
- B23D 47/02 (2006.01)

(52) U.S. Cl.
CPC ............ B23D 45/046 (2013.01); B23D 45/028 (2013.01); B23D 45/048 (2013.01); B23D 47/02 (2013.01); *Y10T 83/7697* (2015.04)

(58) Field of Classification Search
CPC .... B23D 47/02; B23D 45/046; B23D 45/048; B23D 45/28
USPC ........ 83/471.2, 471, 471.3, 522.25, 609, 638, 83/485, 486, 487, 488, 489, 490, 483
See application file for complete search history.

(56) References Cited

U.S. PATENT DOCUMENTS

| | | | | |
|---|---|---|---|---|
| 870,180 A * | 11/1907 | Juengst | ............................. | 83/399 |
| 1,790,888 A * | 2/1931 | Berkel et al. | .................. | 83/471.2 |
| 2,590,093 A * | 3/1952 | Duerr, Jr. | ...................... | 83/471.3 |
| 2,989,094 A * | 6/1961 | Panavas | .......................... | 83/485 |
| 5,241,888 A * | 9/1993 | Chen | ........................... | 83/471.3 |
| 5,257,570 A * | 11/1993 | Shiotani et al. | ............... | 83/471.3 |
| 5,791,224 A * | 8/1998 | Suzuki et al. | .................... | 83/488 |
| 8,061,250 B2 * | 11/2011 | Ushiwata et al. | ............. | 83/471.3 |
| 2006/0156888 A1 * | 7/2006 | Ushiwata et al. | ............... | 83/581 |
| 2009/0031875 A1 | 2/2009 | Ushiwata et al. | | |

FOREIGN PATENT DOCUMENTS

| | | |
|---|---|---|
| JP | 2006-069048 A | 3/2006 |
| JP | 2007223127 A | 9/2007 |

OTHER PUBLICATIONS

Japan Patent Office office actions JPO patent application JP2011-260249 (Jul. 21, 2015).

* cited by examiner

*Primary Examiner* — Kenneth E. Peterson
*Assistant Examiner* — Jennifer Swinney
(74) *Attorney, Agent, or Firm* — Kilpatrick Townsend & Stockton LLP

(57) ABSTRACT

A miter saw including: a base section; a saw blade; a cutting section; a support section; and a guiding mechanism. The support section includes a pivot support portion and a slide support portion. The pivot support portion supports the cutting section such that the cutting section is pivotally moved toward and away from the base section. The slide support portion slidably supports the pivot support portion to move the cutting section in a sliding direction that is in parallel with an upper surface of the base section and orthogonal to an axial direction of a rotational axis of the saw blade. The guiding mechanism is configured to guide a movement of the cutting section in the sliding direction in accordance with a pivotal movement of the cutting section toward the base section. The guiding mechanism is provided in association with the cutting section and the slide support portion.

6 Claims, 9 Drawing Sheets

US 9,174,288 B2

SLIDABLE MITER SAW WITH GUIDING MECHANISM

CROSS REFERENCE TO RELATED APPLICATION

This application claims priority from Japanese Patent Application No. 2011-260249 filed Nov. 29, 2011. The entire content of the priority application is incorporated herein by reference.

TECHNICAL FIELD

The present invention relates to a miter saw, and particularly to a miter saw having a sliding mechanism.

BACKGROUND

Slidable miter saws have been well known in the art. One conventional slidable miter saw has been described to have a base section on which a workpiece is placed, and a cutting section provided with a circular saw for cutting the workpiece. The cutting section can be slid forward (toward the user) and rearward (away from the user) and has a handle for pivotally moving the cutting section upward and downward. When performing a slide-cutting operation with the slidable miter saw in order to cut a wide workpiece, the user begins by sliding the cutting section to its forwardmost position. With the wide workpiece resting on the base section, the user pushes down on the handle to pivotally move the cutting section downward to its lowest position, and then cuts the workpiece by sliding the cutting section rearward.

SUMMARY

To perform this cutting operation, the user must first apply a downward load to the cutting section, and then add a load in the sliding direction. Thus, when cutting the wide workpiece as described above, the direction in which the user applies load to the cutting section changes as the cutting direction changes. However, as the direction of load changes, the user can sometimes unintentionally apply load to the cutting blade in the rightward/leftward direction (an axial direction of a rotation axis of the cutting blade), resulting in process defects, such as unevenness in the cutting surface of the workpiece.

In view of the foregoing, it is an object of the present invention to provide a slidable miter saw that reduces occurrence of such process defects.

In order to attain the above and other objects, the present invention provides a miter saw including: a base section; a saw blade; a cutting section; a support section; and a guiding mechanism. The base section has an upper surface on which a workpiece is placed. The saw blade is configured to cut the workpiece. The cutting section is configured to rotatably support the saw blade. The saw blade has a rotational axis extending in an axial direction and is rotatable about the rotational axis relative to the cutting section. The support section is configured to be supported to the base section and to support the cutting section. The support section includes a pivot support portion and a slide support portion. The pivot support portion is configured to support the cutting section such that the cutting section is pivotally moved toward and away from the base section. The slide support portion is configured to slidably support the pivot support portion to move the cutting section in a sliding direction that is substantially in parallel with the upper surface of the base section and substantially orthogonal to the axial direction of the rotational axis of the saw blade. The guiding mechanism is configured to guide a movement of the cutting section in the sliding direction in accordance with a pivotal movement of the cutting section toward the base section. The guiding mechanism is provided in association with the cutting section and the slide support portion.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
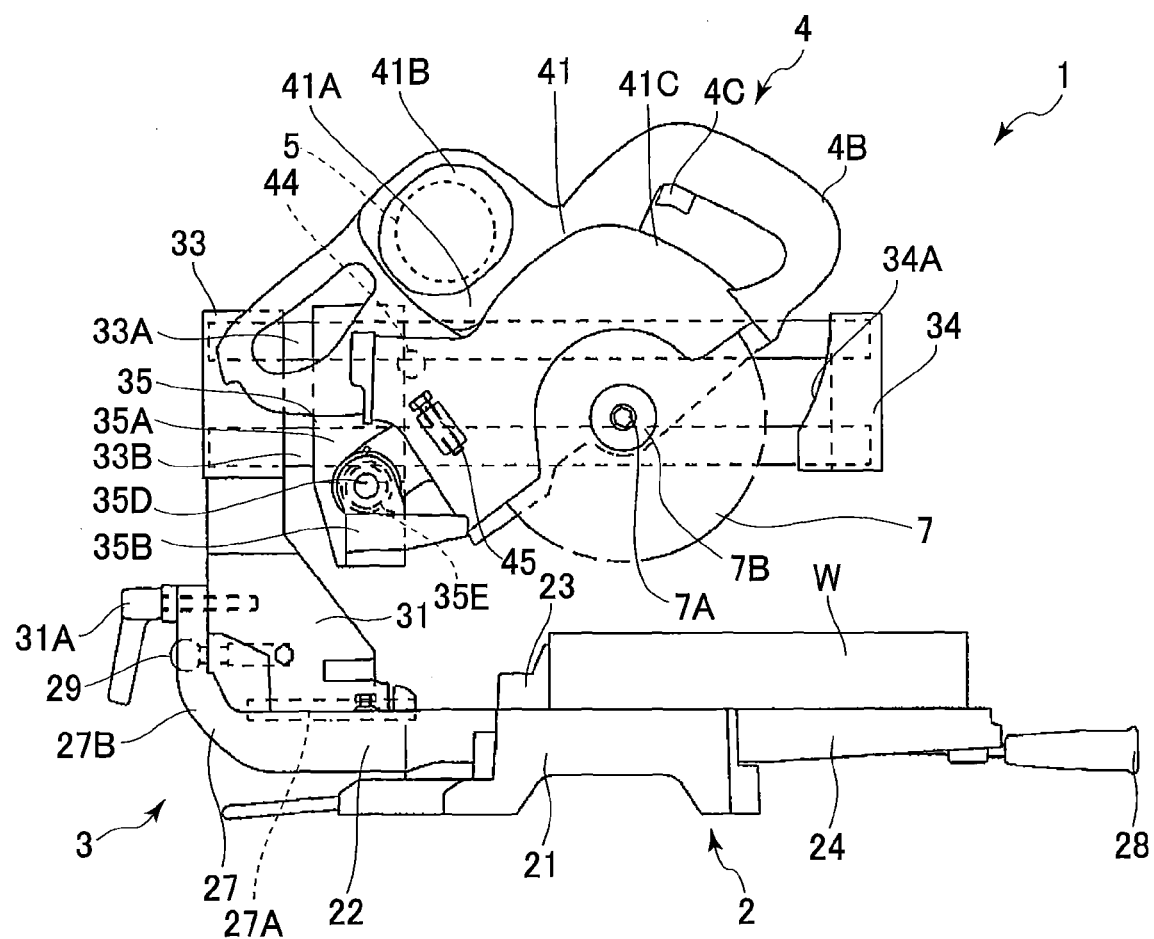
FIG. 1 is a left side view of a slidable miter saw according to one embodiment of the present invention.

A slidable miter saw according to one embodiment of the present invention will be described while referring to FIGS. 1 through 8 wherein like parts and components are designated by the same reference numerals to avoid duplicating description.

In the following description, the terms "upward", "downward", "upper", "lower", "above", "below", "beneath", "right", "left", "front", "rear" and the like will be used assuming that the miter saw 1 is disposed in an orientation in which it is intended to be used. More specifically, top, bottom, left, and right sides in FIG. 1 are top, bottom, rear, and front sides of the miter saw 1. Further, near and far sides in FIG. 1 are left and right sides of the miter saw 1.

The miter saw 1 primarily includes a base section 2, a support section 3, and a cutting section 4. A saw blade 7 is mounted on the cutting section 4. The cutting section 4 can be tilted relative to the base section 2 in a direction orthogonal to a side surface of the saw blade 7. The saw blade 7 is pivotally movable relative to the base section 2 in a direction orthogonal to a rotational axis of the saw blade 7 (i.e. a direction for moving the saw blade 7 toward and away from the base section 2). The saw blade 7 is also rotatable relative to a base plate 21 (described later) about a rotational shaft (described later) extending in a vertical direction. The saw blade 7 is a disc-shaped blade with a through-hole formed in a center thereof for inserting a bolt 7A (rotational shaft). The saw blade 7 cuts a workpiece W (a member subjected to a cutting operation) with its peripheral edge while rotating about the rotational shaft corresponding to the bolt 7A.

Figure 2:
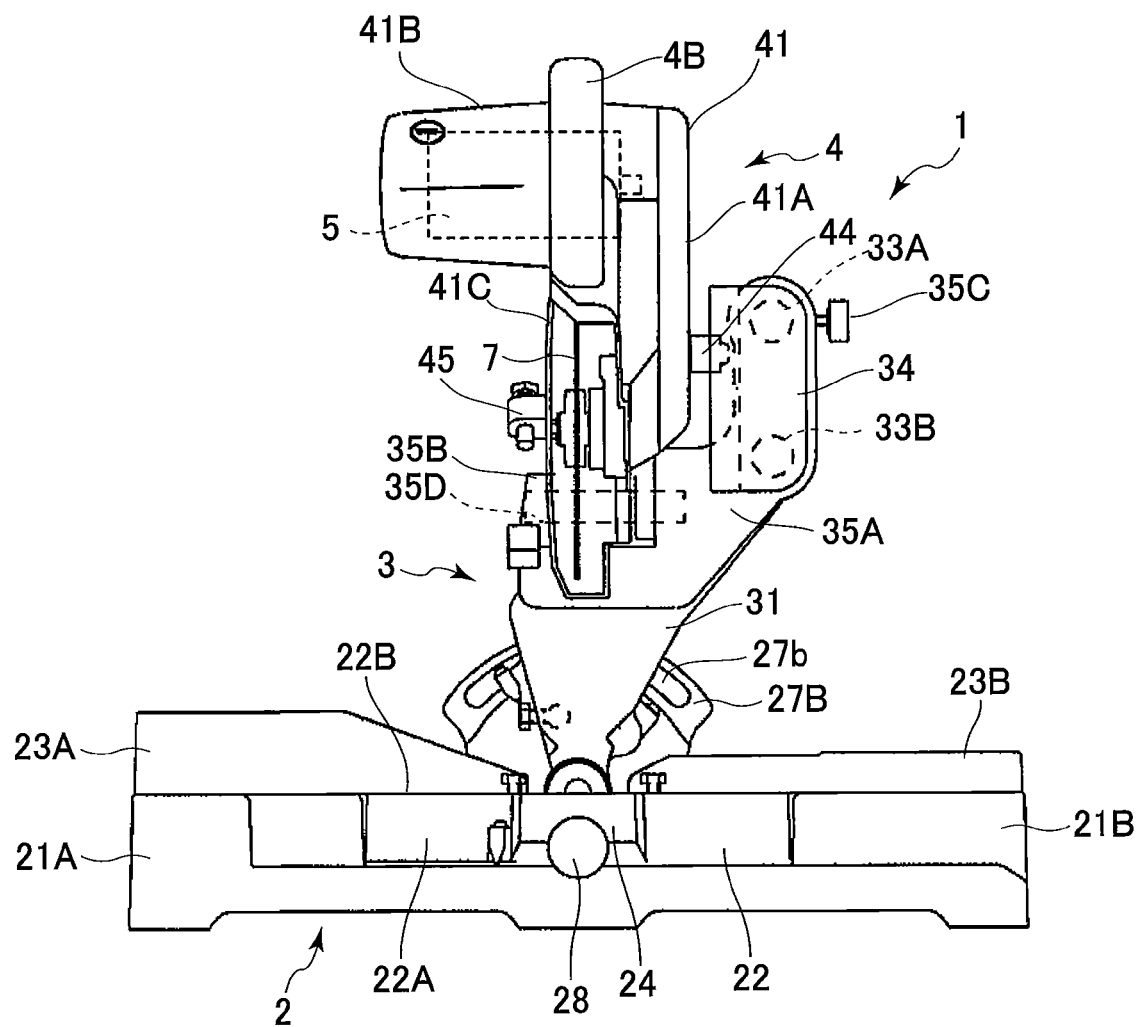
FIG. 2 is a front view of the slidable miter saw according to the embodiment.

The base section 2 primarily includes a base plate 21, a turntable 22, and a fence 23. The base plate 21 is provided for supporting the workpiece W. The turntable 22 is adapted for miter cutting, and is rotatably supported on the base plate 21 by a vertically-extended rotational shaft (not shown, described later) for supporting the workpiece W together with the base plate 21. The fence 23 is provided on the base plate 21. As shown in FIG. 2, the base plate 21 is configured of a pair of a left base plate 21A and a right base plate 21B. The left and right base plates 21A and 21B are juxtaposed in a rightward/leftward direction.

As shown in FIG. 2, the turntable 22 is disposed between the left and right bases 21A and 21B. As shown in FIG. 1, the turntable 22 is configured of a main portion 22A (see FIG. 2), a protruding portion 24, and a cutting-section support portion 27. The main portion 22A is substantially frustoconical in shape. The protruding portion 24 protrudes frontward from the main portion 22A. The cutting-section support portion 27 is provided on a rear side of the main portion 22A for supporting the support section 3 (described later).

The turntable 22 has a top surface 22B formed with a continuous groove (not shown). The groove is formed from a position near the cutting-section support portion 27 to the protruding part 24. The groove is formed in a position at which the saw blade 7 intersects the turntable 22 when the saw blade 7 is pivotally moved downward and serves to receive the edge of the saw blade 7.

As shown in FIGS. 1 and 2, the protruding portion 24 is provided with a handle 28 for restricting the rotation of the turntable 22 relative to the base plate 21. The handle 28 is screwed into the protruding portion 24 such that a rear end of the handle 28 is contactable with a portion of the base plate 21. By rotating the handle 28 in a direction for advancing the rear end rearward until the rear end contacts the base plate 21, the user can fix the turntable 22 relative to the base plate 21 to prevent the turntable 22 from rotating.

As shown in FIG. 1, the cutting-section support portion 27 is disposed opposite to the rotational shaft (not shown) of the turntable 22 with respect to the protruding portion 24. The cutting-section support portion 27 is adapted for bevel cutting, and has a tilting shaft 27A and a tilting support portion 27B. The tilting shaft 27A is positioned along an extension to the groove (not shown). The tilting support portion 27B is erected upward from a rearmost end of the cutting-section support portion 27. The cutting-section support portion 27 is integrally formed with the turntable 22.

As shown in FIG. 2, the tilting support portion 27B is formed with an arcuate shaped elongate hole 27b. The elongate hole 27b penetrates a thickness of the tilting support portion 27B in a frontward/rearward direction and is elongated in the rightward/leftward direction. A clamp 31A (described later) is inserted into the elongate hole 27b.

As shown in FIG. 1, a pin 29 is provided at the tilting support portion 27B for setting the position of the cutting section 4. The pin 29 has a rounded bar shape. The pin 29 is supported in the tilting support portion 27B with its axis aligned in the frontward/rearward direction and is capable of moving forward and rearward. When the pin 29 is moved forward, its front end protrudes forward from the tilting support portion 27B. The front end of the pin 29 protruding forward from the tilting support portion 27B can be engaged with a tilting portion 31 (described later) to hold the tilting portion 31 in a position perpendicular to the base section 2. When not otherwise specified, the following description assumes that the tilting portion 31 is maintained in a position perpendicular to the base section 2 and that the rotational axis of the saw blade 7 is orthogonal to the frontward/rearward direction.

The fence 23 is disposed on the base plate 21 at a position above the turntable 22. As shown in FIG. 2, the fence 23 is configured of a left fence 23A and a right fence 23B corresponding to the left base plate 21A and the right base plate 21B, respectively. Front surfaces of the left and right fences 23A and 23B occupy the same plane and function to restrict the position of the workpiece W.

The support section 3 is supported to the base section 2. Further, the support section 3 supports the cutting section 4 above the base section 2. As shown in FIG. 1, the support section 3 primarily includes the tilting portion 31, a slide support portion 33, a guide portion 34, and a pivot support portion 35. The tilting portion 31 is supported to the turntable 22 by the tilting shaft 27A. The clamp 31A is inserted through the elongate hole 27b of the tilting support portion 27B (FIG. 2) and screwed into the tilting portion 31. The tilting portion 31 is fixed to the tilting support portion 27B by tightening the clamp 31A. The tilting portion 31 can tilt leftward and rightward when the clamp 31A is loosened. Since the clamp 31A is inserted through the elongate hole 27b, the angle in which the tilting portion 31 can tilt relative to the tilting support portion 27B is restricted to the range in which the clamp 31A can move within the elongate hole 27b.

The slide support portion 33 is adapted to slidably support the pivot support portion 35 to move the cutting section 4 in a sliding direction (i.e. frontward/rearward direction). The slide support portion 33 is provided integrally with the tilting portion 31 on an upper portion thereof. The slide support portion 33 has two pipes 33A and 33B. When the tilting portion 31 is perpendicular to the top surface of the base section 2, the pipes 33A and 33B are parallel to each other and juxtaposed in a direction perpendicular to the base section 2

(the vertical direction in FIG. 1) and are both parallel to the top surface of the base section 2 and the groove (not shown) formed in the turntable 22.

The guide portion 34 is mounted on front ends of the pipes 33A and 33B, coupling the front ends together. The guide portion 34 has a guide surface 34A at a rear edge of the guide portion 34. The guide surface 34A will be described later in detail.

The pivot support portion 35 is adapted to support the cutting section 4 such that the cutting section 4 is pivotally moved toward and away from the base section 2. The pivot support portion 35 is configured of a sliding portion 35A and an arm portion 35B. The sliding portion 35A is formed with two through-holes (not shown) extending parallel to each other. The pipes 33A and 33B are inserted through these through-holes. The pivot support portion 35 can move along a longitudinal direction of the pipes 33A and 33B (frontward/rearward direction in FIG. 1) when slidingly moved relative to the pipes 33A and 33B in the front-rear direction. A knob 35C (see FIG. 2) is screwed into the sliding portion 35A. When the knob 35C is screwed into the sliding portion 35A, a left end of the knob 35C advances and protrudes into the through-hole formed in the sliding portion 35A. Accordingly, the sliding portion 35A can be fixed relative to the pipes 33A and 33B by screwing the knob 35C into the sliding portion 35A.

The arm portion 35B is configured of a pair of arm members, and is generally U-shaped in a front view. The arm portion 35B extends from the sliding portion 35A, so that the arm portion 35B can be moved integrally with the sliding portion 35A. A pivot shaft 35D spans between the pair of arm members constituting the arm portion 35B for pivotally supporting the cutting section 4. The pivot shaft 35D is oriented with its axis parallel to the top surface of the base section 2. The pivot shaft 35D is mounted in the arm portion 35B along a direction orthogonal to the sliding direction of the sliding portion 35A. A spring 35E is provided at the pivot shaft 35D. The spring 35E applies an urging force to the cutting section 4 for urging the cutting section 4 upward (away from the top surface of the base section 2).

The cutting section 4 is adapted to rotatably support the saw blade 7. The cutting section 4 includes a housing 41 that serves as its outer case. The housing 41 is pivotally supported to the pivot shaft 35D. As shown in FIGS. 1 and 2, the housing 41 includes a main portion 41A, a motor accommodating portion 41B, and a saw blade accommodating portion 41C. The main portion 41A is pivotally supported to the arm portion 35B and accommodates a gear mechanism (not shown) therein. The cutting section 4 also includes a handle 4B and a trigger 4C. The trigger 4C is provided at the handle 4B for starting and stopping rotation of a motor 5. The main portion 41A has a lower portion at which a rotational shaft (not shown) is provided. The saw blade 7 is fixed to the rotational shaft by the bolt 7A inserted through a flange 7B.

Figure 3:
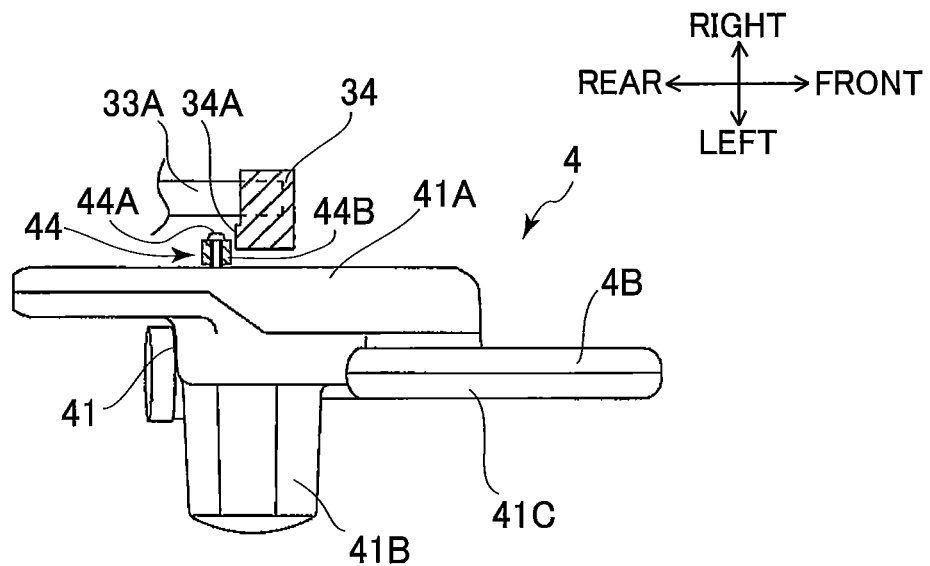
FIG. 3 is a top plan view with partial cross section showing a relationship between a roller and a guide portion of the slidable miter saw according to the embodiment.
Figure 3:
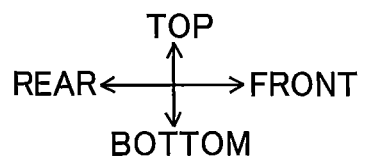

The main portion 41A has a side surface opposite to the guide portion 34 on which a roller 44 is provided. The roller 44 is positioned to intersect a region near the guide portion 34 when the cutting section 4 is pivotally moved. The roller 44 is configured of a pin 44A fixed to the main portion 41A, and an annular portion 44B rotatably supported to the pin 44A. The annular portion 44B can rotate relative to the main portion 41A about the axis of the pin 44A. As shown in FIG. 3, the roller 44 protrudes out of the main portion 41A an amount greater than a distance from the main portion 41A to the guide portion 34. As shown in FIG. 2, the roller 44 is disposed at a position beneath a top edge of the guide portion 34 when the cutting section 4 is in its uppermost position. Hence, the roller 44 is positioned to contact the guide portion 34 when the cutting section 4 moves forward.

The motor accommodating portion 41B extends leftward from a top portion of the main portion 41A above the saw blade 7. The motor 5 is accommodated in the motor accommodating portion 41B and adapted to drive the gear mechanism (not shown) provided in the main portion 41A.

The saw blade accommodating portion 41C is positioned on a left side of the main portion 41A and adapted to cover a top half portion of the saw blade 7. A stopper 45 is provided at the saw blade accommodating portion 41C near the arm portion 35B. The stopper 45 contacts the arm portion 35B when the cutting section 4 is pivotally moved downward to a prescribed angle. The stopper 45 is screwed into a portion of the saw blade accommodating portion 41C. The stopper 45 is adapted to adjust a distance that the cutting section 4 is capable of pivotally moving downward by being screwed farther inward into or outward from the portion.

Next, the guide surface 34A and the roller 44 will be described in detail. A combination of the guide portion 34 (guide surface 34A) and the roller 44 constitutes a guiding mechanism. The guiding mechanism is configured to guide a movement of the cutting section 4 in the sliding direction in accordance with a pivotal movement of the cutting section 4 toward the base section 2. The guiding mechanism is provided in association with the cutting section 4 and the slide support portion 33.

Figure 4:
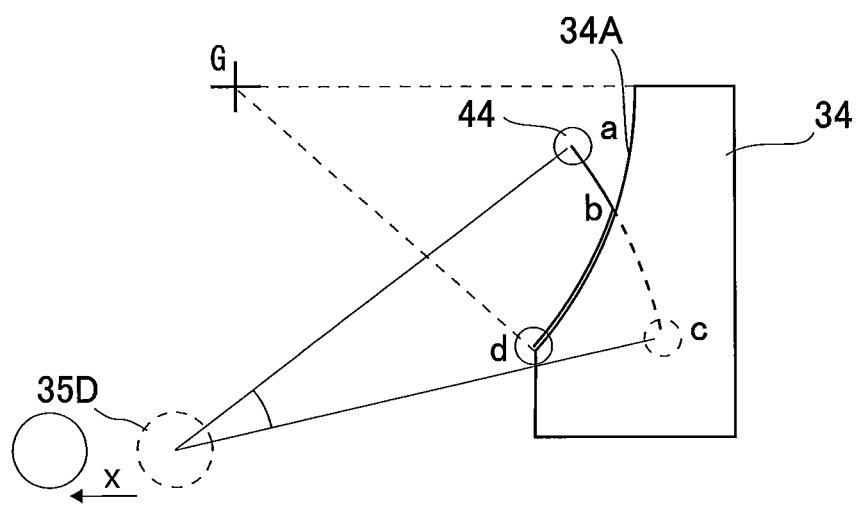
FIG. 4 is an explanatory diagram showing an operational relationship between the roller and the guide portion of the slidable miter saw according to the embodiment.

As shown in FIGS. 1 and 4, in a cross section of the guide surface 34A taken orthogonally to the rightward/leftward direction, the guide surface 34A has an arc shape with a convex side on a bottom. A circle that includes this arc has a center point on an imaginary central axis G that extends in the rightward/leftward direction. The imaginary central axis G is parallel to the pivot shaft 35D and is positioned diagonally above and forward of the pivot shaft 35D when the cutting section 4 is slidingly moved to its forwardmost position. The arc of the guide surface 34A is such that the guide surface 34A intersects a path of the roller 44 as the cutting section 4 is pivotally moved (an arcuate path indicated by a segment a-b-c in FIG. 4) when the guide portion 34 (the guide surface 34A) is not present (i.e., when the roller 44 does not contact the guide surface 34A) and such that the guide surface 34A non-orthogonally intersects a tangent to the path of the roller 44.

In other words, the roller 44 provides the arcuate path when the cutting section 4 is pivotally moved relative to the slide support portion 33 assuming that the roller 44 is out of contact from the guide portion 34. The arcuate path of the roller 44 intersects the guide portion 34 at an intersecting point assuming that the roller 44 is contactable with the guide portion 34. The guide surface 34A of the guide portion 34 intersects a tangential line of the path at the intersecting point at a non-orthogonal angle.

The imaginary central axis G of the circle including the arc of the guide surface 34A is located at a different position from a pivot center of the saw blade 7 (the pivot shaft 35D), and a radius of the circle including the arc-shaped guide surface 34A is not equal to a radius of the circle including the arc-shaped path of the roller 44.

Figure 5:
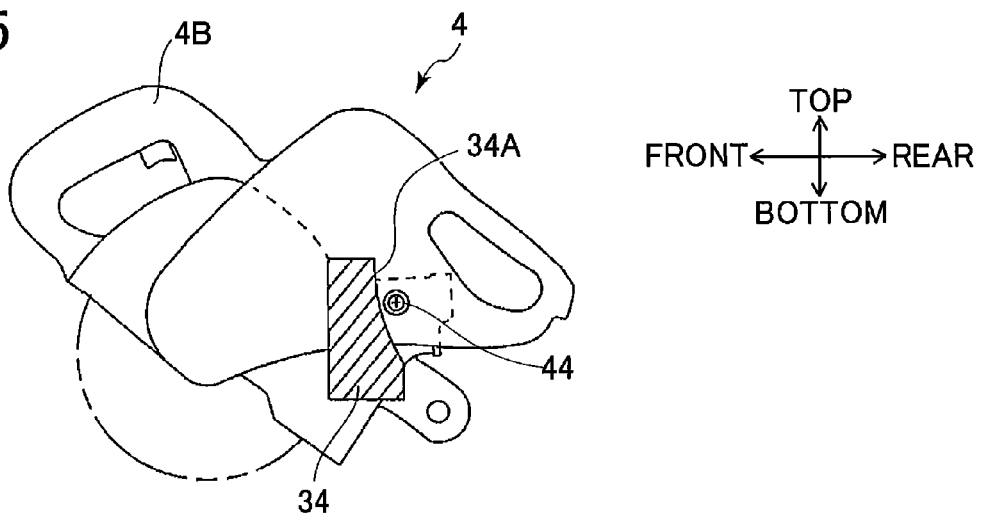
FIG. 5 is a right side view with partial cross section showing the relationship between the roller and the guide portion of the slidable miter saw according to the embodiment, in which the roller is not in contact with a guide surface of the guide portion.
Figure 6:
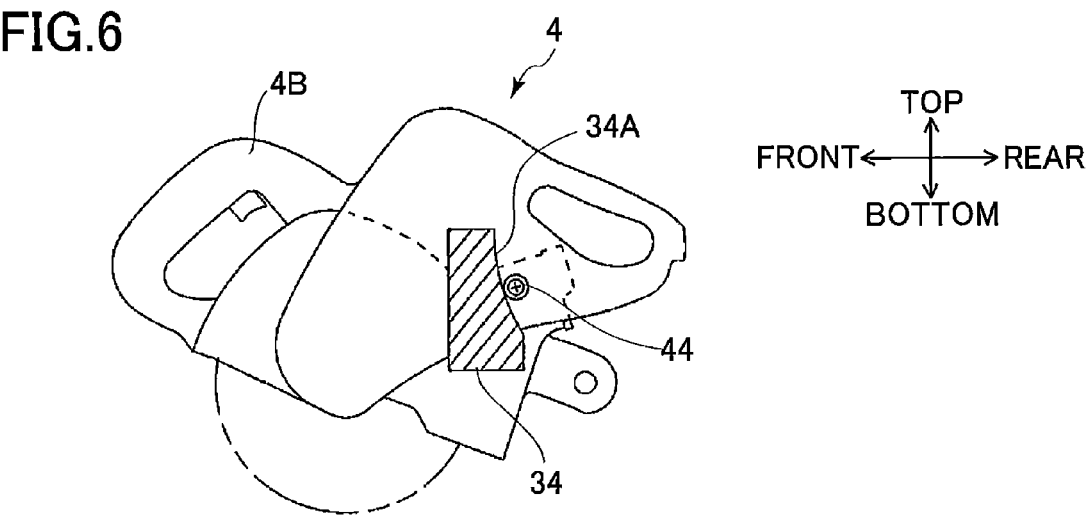
FIG. 6 is a right side view with partial cross section showing the relationship between the roller and the guide portion of the sliadable miter saw according to the embodiment, in which the roller is in contact with the guide surface of the abutted portion.
Figure 7:
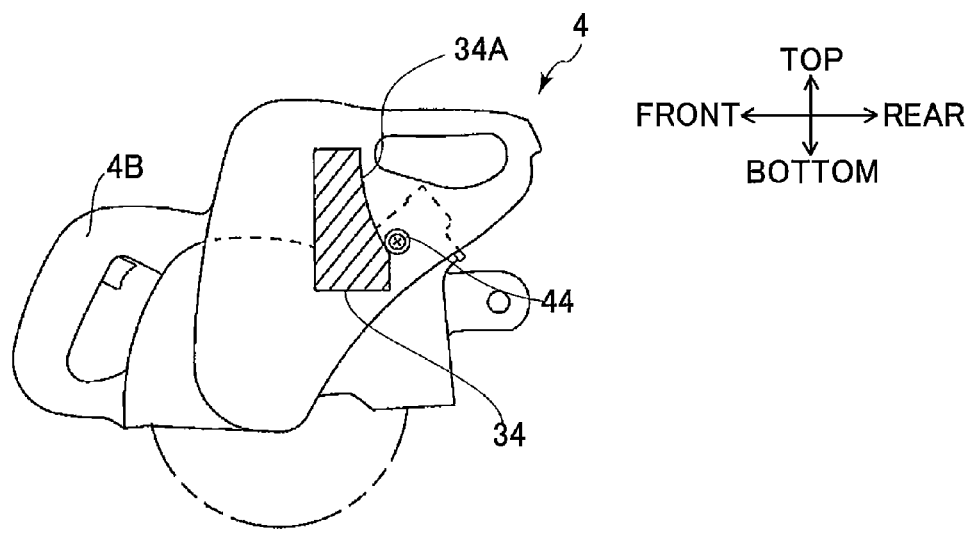
FIG. 7 is a right side view with partial cross section showing the relationship between the roller and the guide portion of the slidable miter saw according to the embodiment, in which a cutting section has been pivotally moved to its lowest position.

With the cutting section 4 slidingly moved to its forward-most position, the user grips the handle 4B and pivotally moves the cutting section 4 downward (toward the base section 2) from a point a shown in FIG. 4. The cutting section 4 moves along the segment a-b in FIG. 4 until the roller 44 contacts the guide surface 34A, as shown in FIG. 5. After the roller 44 contacts the guide surface 34A at point b (FIG. 4), the cutting section 4 moves downward along the segment b-d while the roller 44 is guided by the guide surface 34A, as shown in FIG. 6. When the roller 44 has moved to a bottom edge of the guide surface 34A, as shown in FIG. 7, the stopper 45 contacts the arm portion 35B (FIG. 1), which stops the cutting section 4 from pivotally moving farther.

Since the roller 44 is not contacting the guide surface 34A when moving in the segment a-b, the roller 44 does not receive a reaction force at this time. Hence, the cutting section 4 merely pivotally moves about the pivot shaft 35D and performs no other operation than pivotal movement. However, when the roller 44 is in contact with the guide surface 34A in the segment b-d, the roller 44 receives a reaction force from the guide surface 34A that causes the cutting section 4 to move rearward as the sliding portion 35A is slidingly moved along the pipes 33A and 33B. More specifically, when pivotally moved, the guide portion 34 moves along an arrow A in FIG. 8 (corresponding to a segment a'-b') and then along an arrow B (corresponding to a segment b'-d'). Points a', b', c', and d' in FIG. 8 respectively correspond to points a, b, c, and d in FIG. 4 and indicate the positions of the bolt 7A corresponding to the central axis of the saw blade 7.

Figure 8:
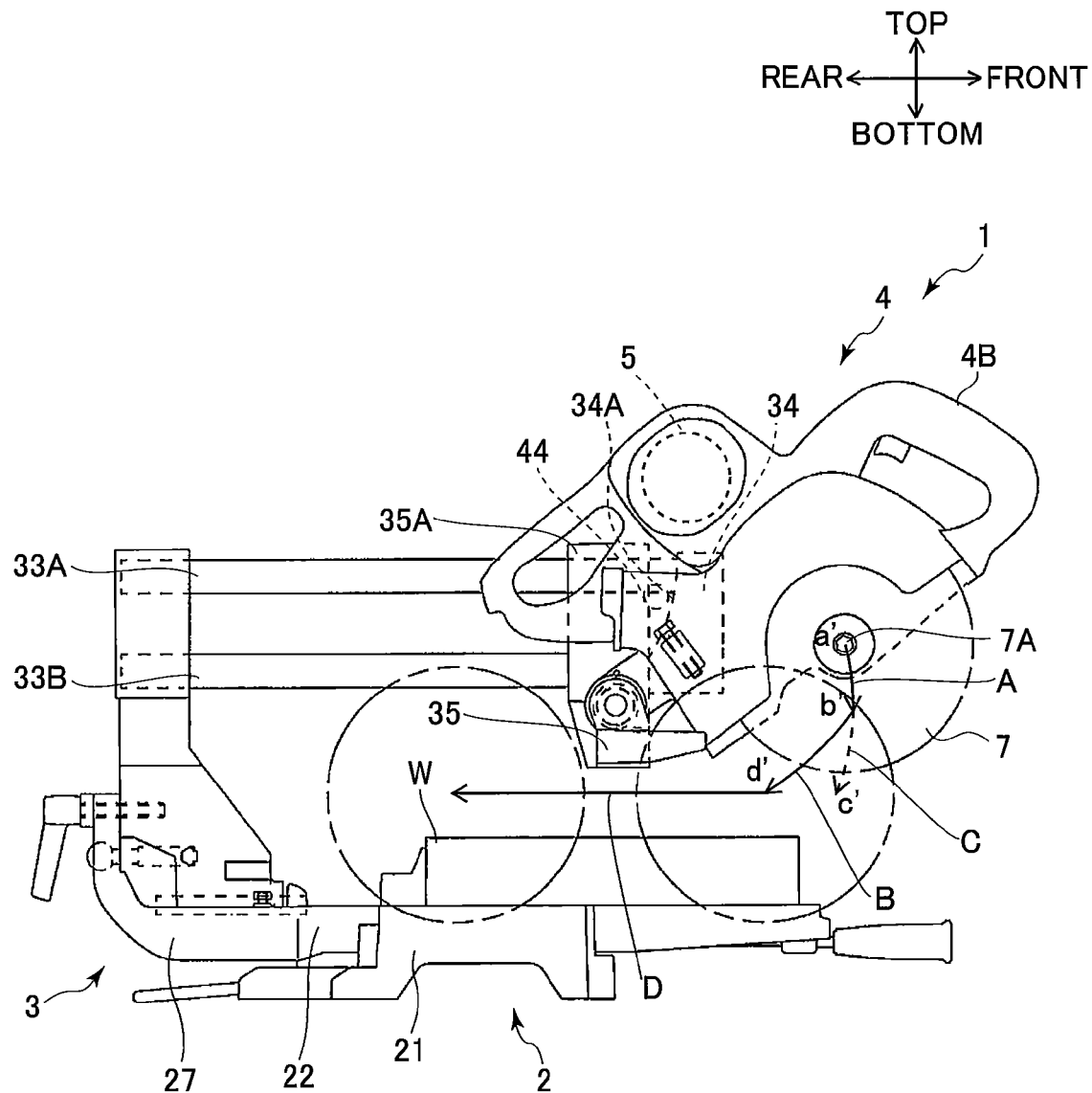
FIG. 8 is a left side view illustrating a pivotal movement of the cutting section of the slidable miter saw according to the embodiment.
Figure 9:
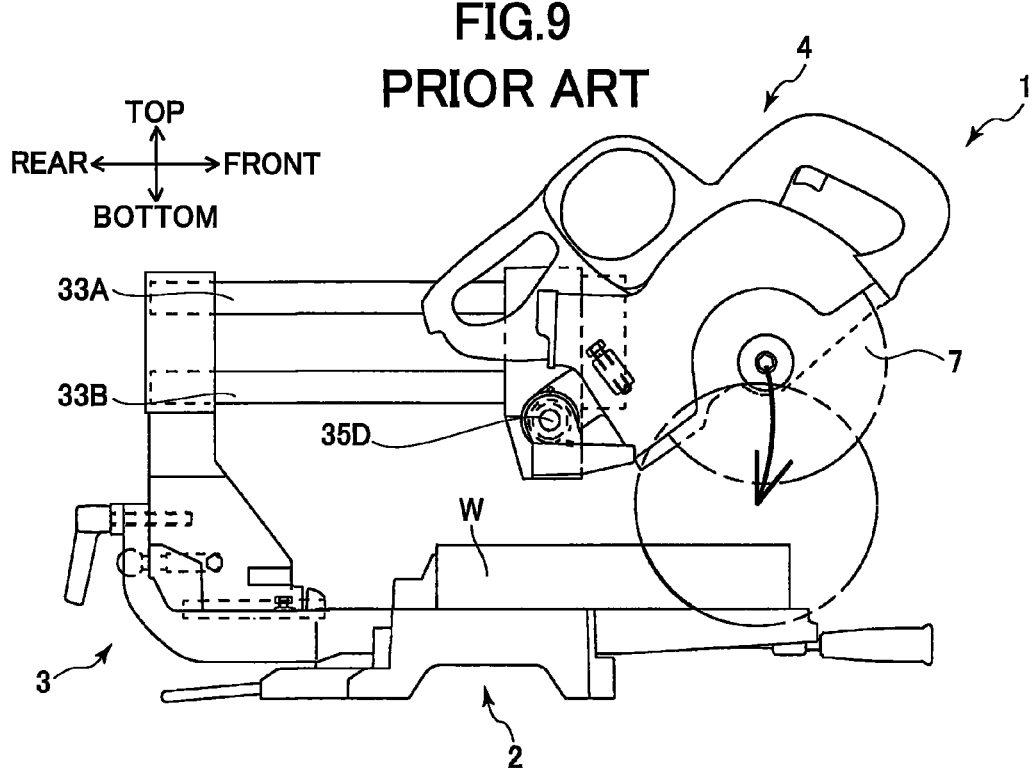
FIG. 9 is a left side view illustrating a pivotal movement of a cutting section in a conventional slidable miter saw.

If the roller 44 were not to contact the guide surface 34A of the guide portion 34, as described above, i.e., if the roller 44 were not to receive a reaction force from the guide surface 34A, then the saw blade 7 would move in a direction indicated by an arrow in FIG. 9. Through this operation, the bolt 7A of the saw blade 7 would move along the arrow A in FIG. 8 (the segment a'-b') and then along the arrow C (the segment b'-c').

Figure 10:
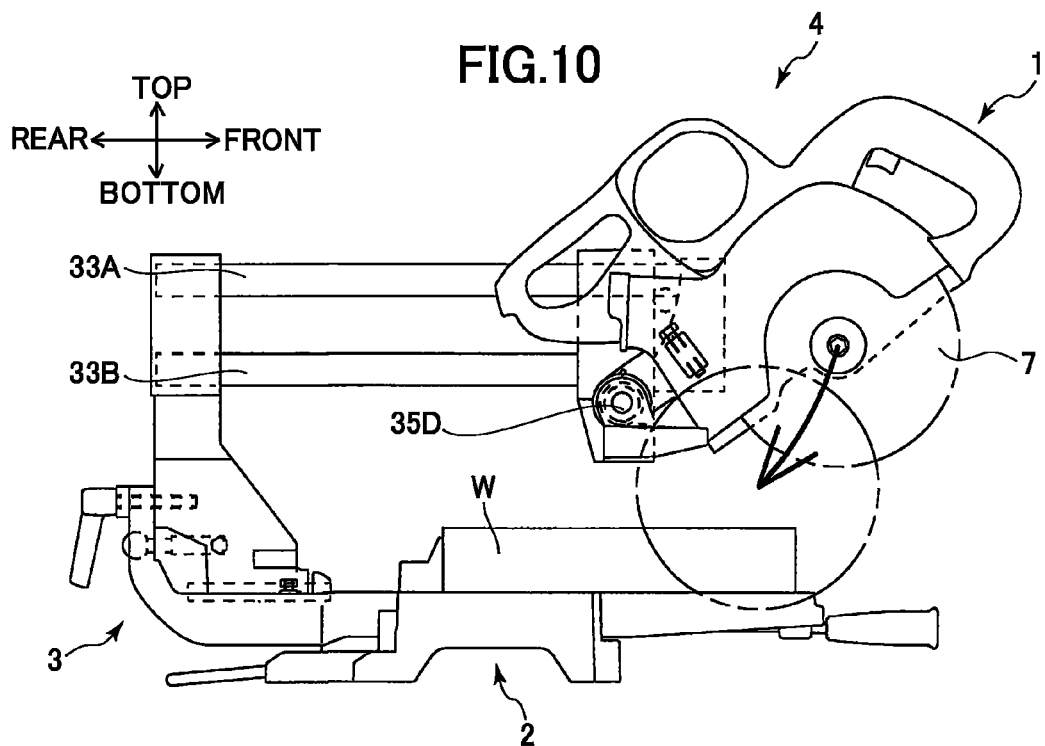
FIG. 10 is a left side view illustrating a pivotal movement of the cutting section in the slidable miter saw according to the embodiment.

However, since the roller 44 contacts the guide surface 34A as the cutting section 4 is pivotally moved as shown in FIG. 10, the saw blade 7 moves in a direction of an arrow in FIG. 10 so that the bolt 7A moves along the arrow A in FIG. 8 (the segment a'-b') and then along the arrow B (the segment b'-d'), moving rearward a distance from the point c' to the point d', i.e., from a state shown in FIG. 9 (a conventional state) to a state shown in FIG. 10 (a state of the present embodiment). Thereafter, the user pushes the cutting section 4 rearward in a direction following an arrow D in FIG. 8, enabling the cutting section 4 to cut a wide workpiece W.

Note that FIG. 10 shows a path of the saw blade 7 beginning from a state in which the roller 44 is in contact with the guide surface 34A (indicated by the arrow).

Hence, by pushing downward on the handle 4B to pivotally move the cutting section 4 downward toward the base section 2, the user can move the cutting section 4 in a rearward direction. In other words, the user can pivotally move the cutting section 4 downward while slidingly moving the cutting section 4 in the sliding direction simply by applying a unidirectional (downward) force to the cutting section 4. Accordingly, the miter saw 1 facilitates a smooth transition from the pivoting operation to the sliding operation, while preventing a directional change in the load applied to the cutting section 4 as the cutting direction changes.

Specifically, when the roller 44 moves to the point d (i.e., when the bolt 7A moves to the point d'), the cutting section 4 can no longer pivotally move farther downward and begins to move rearward. However, since the cutting section 4 is already moving rearward when the roller 44 reaches the point d, the change in the operating direction of the cutting section 4 is smaller and smoother as the user begins urging the cutting section 4 rearward from this state.

Consequently, when the saw blade 7 pivotally moves and slidingly moves as the user is operating the cutting section 4, the saw blade 7 does not stop at any point during the transition from the pivoting operation to the sliding operation, minimizing any load applied to the cutting section 4 unintentionally in the rightward/leftward direction. This configuration can reduce occurrence of an uneven cut formed in the workpiece W due to the saw blade 7 wobbling left and right, thereby minimizing cutting defects.

Figure 11A:
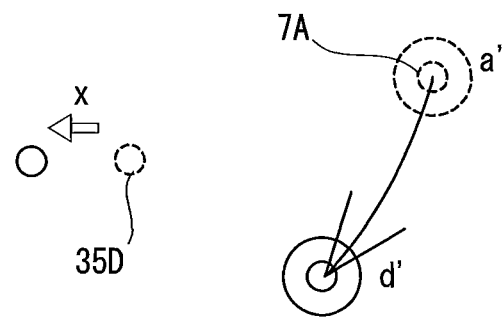
FIG. 11A is an explanatory diagram illustrating pivotal and sliding movements of the cutting section in the slidable miter saw according to the embodiment.
Figure 11B:
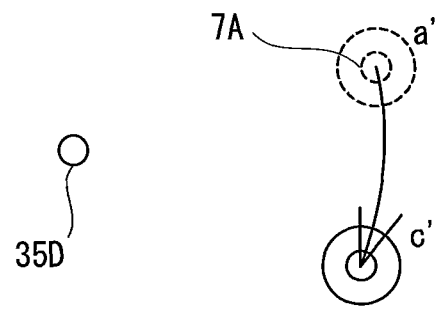
FIG. 11B is an explanatory diagram illustrating pivotal and sliding movements of the cutting section in the conventional slidable miter saw.

Next, a relationship between the bolt 7A, which is the rotational axis of the saw blade 7, and the pivot shaft 35D of the cutting section 4 will be described with reference to FIGS. 11A and 11B. When the cutting section 4 of a conventional slidable miter saw is pivotally moved from its uppermost position to its lowermost position, the bolt 7A moves from the point a' to the point c' while the pivot shaft 35D remains in its original position (the position when the cutting section 4 is in its uppermost position; see FIG. 11B). In contrast, when the cutting section 4 in the present embodiment pivotally moves from its uppermost position to its lowermost position, the bolt 7A moves from the point a' to the point d' while the pivot shaft 35D moves rearward a distance X from its original position (see FIG. 11A), enabling the cutting section 4 to transition smoothly from the pivoting operation to the sliding operation.

The roller 44 as a rotary body and the guide surface 34A constitute the guiding mechanism in this embodiment. With this configuration, the roller 44 rolls over the guide surface 34A as the cutting section 4 pivotally moves in order to guide the cutting section 4 suitably in a rearward direction (sliding direction).

Further, various variations and modifications are conceivable.

For example, in the above described embodiment, the guide portion 34 is fixed to the front ends of the pipes 33A and 33B. However, in a first modification to the above-described embodiment, a guide portion 134 can be moved in the frontward/rearward direction relative to the pipes 33A and 33B and can be fixed at any desired position.

Figure 12:
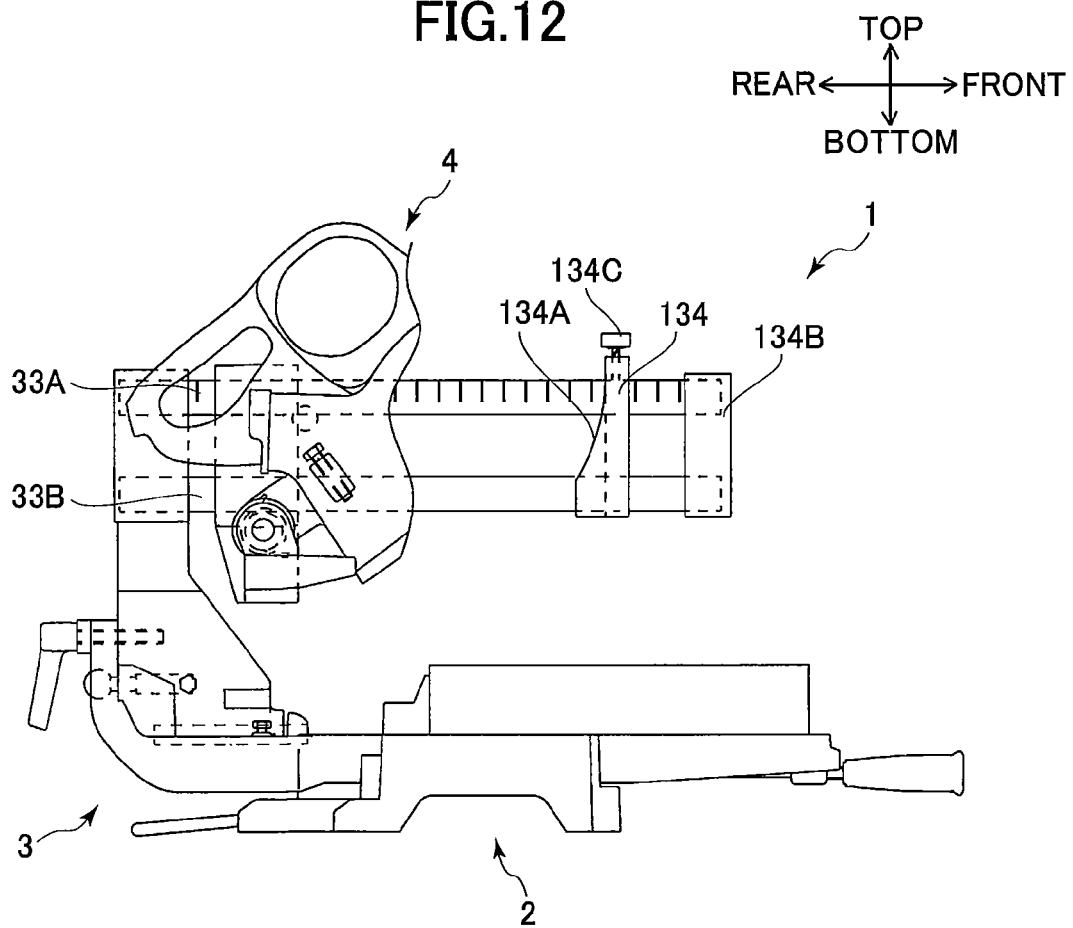
FIG. 12 is a left side view of a slidable miter saw according to a first modification to the embodiment.

More specifically, as shown in FIG. 12, a fixed portion 134B is mounted on the front ends of the pipes 33A and 33B for fixedly coupling the same. The guide portion 134 is provided on the pipes 33A and 33B between the fixed portion 134B and the slide support portion 33 and is movable forward and rearward relative to the pipes 33A and 33B. The guide portion 134 has a rear edge on which a guide surface 134A is formed. Further, the guide portion 134 is provided with a knob 134C for fixing the guide portion 134 at a prescribed position in the frontward/rearward direction relative to the pipes 33A and 33B.

Figure 13:
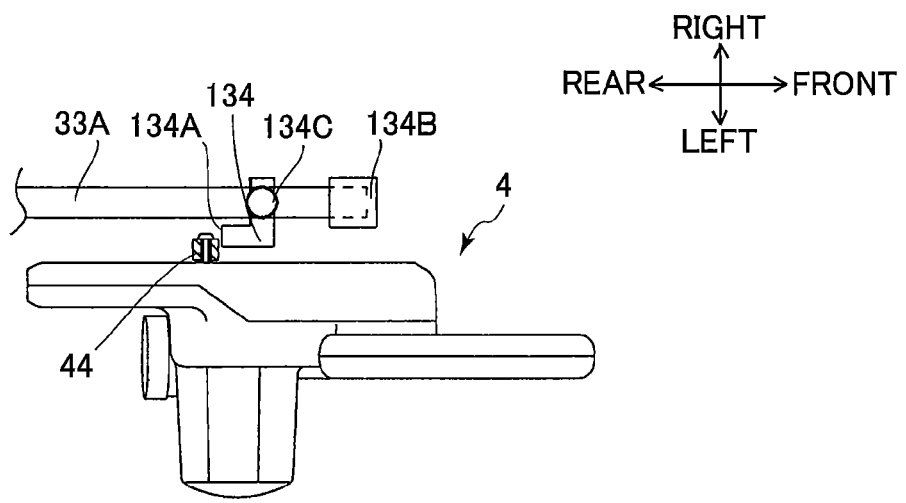
FIG. 13 is a top plan view with partial cross section showing a relationship between a roller and a guide portion of the slidable miter saw according to the first modification.

With this configuration, the roller 44 and the guide portion 134 (the guide surface 134A) function as the guiding mechanism at a prescribed position on the pipes 33A and 33B relative to the sliding direction, as illustrated in FIG. 13. Hence, this guiding mechanism can be used to cut workpieces W having various widths.

With such a configuration that allows the guide portion 134 to move relative to the pipes 33A and 33B, as in the example of FIGS. 12 and 13, it is preferable to provide a position indicator to indicate the position of the cutting section 4 relative to the pipes 33A and 33B, such as graduation marks provided along the sliding pipe 33A or 33B. Providing such a position indicator facilitates the user in determining the position of the saw blade 7 (the guide portion 134) relative to the pipes 33A and 33B.

Figure 14:
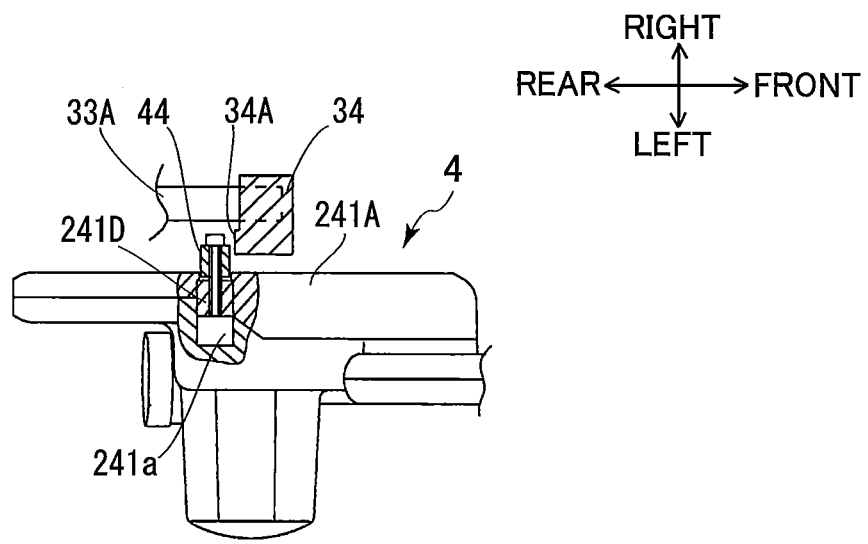
FIG. 14 is a top plan view with partial cross section showing a cutting section of a slidable miter saw according to a second modification to the embodiment, in which a roller is capable of contacting a guide portion.

Further, in the above-described embodiment, the roller 44 is configured to contact the guide portion 34 as the cutting section 4 pivotally moves. However, according to a second modification to the above-described embodiment shown in FIG. 14, the roller 44 may be moved to a position of non-contact when the cutting section 4 is pivotally moved. The housing 41 includes a main portion 241A in which an accommodating portion 241a is formed. The accommodating portion 241a is elongated in an axial direction of a roller shaft of the roller 44 where the roller 44 is assembled to the main portion 241A. A roller support portion 241D is provided in the accommodating portion 241a for holding the roller 44. The roller support portion 241D can move within the accommodating portion 241a along the axial direction of the roller 44. The user can slidingly move the roller 44 in the axial direction by holding a head portion of the roller shaft of the roller 44.

The dimension of the accommodating portion 241a on an edge nearest the roller 44 (i.e., the front-rear dimension in FIG. 14 of the opening formed in the main portion 241A) is greater than a diameter of the roller 44, but smaller than the dimension of the roller support part 241D in a direction orthogonal to the roller shaft (i.e. the frontward/rearward direction in FIG. 14) to prevent the roller support portion 241D from coming out of the accommodating portion 241a. Note that when the roller 44 is withdrawn into the accommodating portion 241a (FIG. 15), the head portion of the roller shaft is positioned so as not to contact the guide surface 34A.

Figure 15:
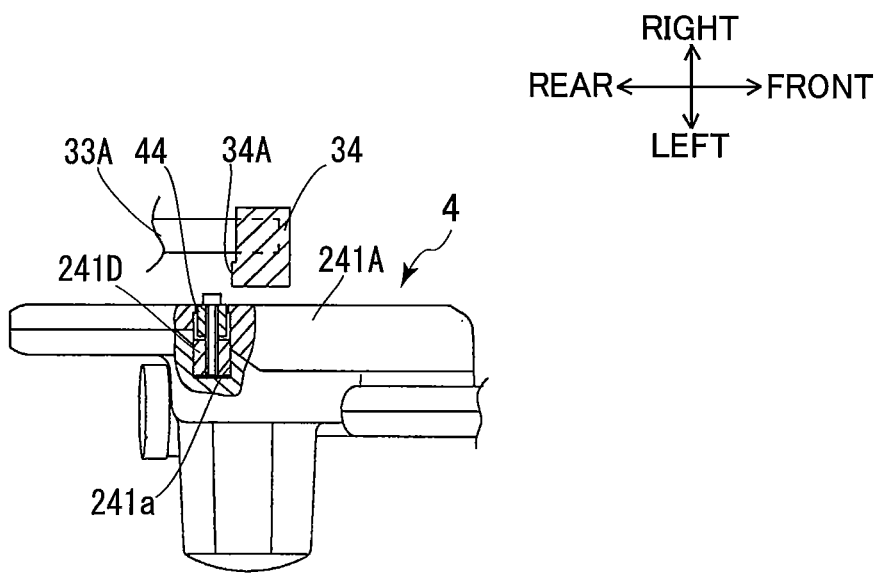
FIG. 15 is a top plan view with partial cross section showing the cutting section of a slidable miter saw according to the second modification to the embodiment, in which the roller is incapable of contacting the guide portion.

With this configuration, the roller 44 can be positioned so as not to contact the guide portion 34, as shown in FIG. 15, when cutting workpieces W for which it is preferable not to use the guiding mechanism. This configuration is particularly effective for cutting operations requiring the cutting section 4 only to pivotally move and not to slidingly move.

Further, in the above-described embodiment, the roller 44 is provided at the cutting section 4 and the guide portion 34 is provided at the slide support portion 33. However, the guide portion 34 may be provided at the cutting section 4 and the roller 44 may be provided at the slide support portion 33 instead. In this case, the roller 44 is provided on the fixed portion 134B (FIG. 12) that couples the pipes 33A and 33B and is positioned to face toward the pipes 33A and 33B from the fixed portion 134B (rearward). The roller 44 has a rotational axis extending parallel to the rotational axis of the saw blade 7. The guide portion 34 may be provided at the cutting section 4, protruding outward from the side surface of the main portion 41A of the housing 41 toward the pipes 33A and 33B with the guide surface 34A facing the roller 44.

While the present invention has been described in detail with reference to the embodiment thereof, it would be apparent to those skilled in the art that various changes and modifications may be made therein without departing from the spirit of the present invention.

What is claimed is:

1. A miter saw comprising:
   a base section having an upper surface on which a workpiece is placed;
   a saw blade configured to cut the workpiece;
   a cutting section configured to rotatably support the saw blade, the saw blade having a rotational axis extending in an axial direction and being rotatable about the rotational axis relative to the cutting section;
   a support section configured to be supported to the base section and to support the cutting section, the support section including a pivot support portion and a slide support portion, the pivot support portion being configured to support the cutting section such that the cutting section is pivotally moved toward and away from the base section, the slide support portion being configured to slidably support the pivot support portion to move the cutting section in a sliding direction that is substantially in parallel with the upper surface of the base section and substantially orthogonal to the axial direction of the rotational axis of the saw blade; and
   a guiding mechanism including a contact portion and a guide portion, the contact portion being provided at one of the cutting section and the slide support portion, the guide portion being provided at remaining one of the cutting section and the slide support portion, the guide portion being contactable with the contact portion, the guiding mechanism being configured to guide a movement of the cutting section in the sliding direction in accordance with the pivotal movement of the cutting section toward the base section, the contact portion being brought into contact with the guide portion to be guided by the guide portion, thereby leading the cutting section to be moved in the sliding direction.

2. The miter saw as claimed in claim 1, wherein the contact portion is configured of a rotary body, and
   wherein the guide portion has a guide surface on which the rotary body is rotatably movable.

3. The miter saw as claimed in claim 1, wherein one of the contact portion and the guide portion is provided at the slide support portion, the one of the contact portion and the guide portion being configured to be slidably moved in the sliding direction and to be fixed at a predetermined position in the sliding direction, the one of the contact portion and the guide portion being contactable with remaining one of the contact portion and the guide portion when fixed at the predetermined position.

4. The miter saw as claimed in claim 3, wherein the slide support portion has a position indicator to indicate a position in the sliding direction of the one of the contact portion and the guide portion relative to the slide support portion.

5. The miter saw as claimed in claim 1, wherein the one of the contact portion and the guide portion is movable to prevent the one of the contact portion and the guide portion from contacting with remaining one of the contact portion and the guide portion.

6. A miter saw comprising:
   a base section having an upper surface on which a workpiece is placed;
   a saw blade configured to cut the workpiece;
   a cutting section configured to rotatably support the saw blade, the saw blade having a rotational axis extending in an axial direction and being rotatable about the rotational axis relative to the cutting section;
   a support section configured to be supported to the base section and to support the cutting section, the support section including a pivot support portion and a slide support portion, the pivot support portion being configured to support the cutting section such that the cutting section is pivotally moved toward and away from the base section, the slide support portion being configured to slidably support the pivot support portion to move the cutting section in a sliding direction that is substantially in parallel with the upper surface of the base section and substantially orthogonal to the axial direction of the rotational axis of the saw blade; and
   a guiding mechanism configured to guide a movement of the cutting section in the sliding direction in accordance with the pivotal movement of the cutting section toward the base section, wherein the guiding mechanism includes a contact portion and a guide portion,
   the contact portion being provided at one of the cutting section and the slide support portion;
   the guide portion being provided at remaining one of the cutting section and the slide support portion, the guide portion being contactable with the contact portion,
   wherein, the contact portion provides an arcuate path when the cutting section is pivotally moved relative to the slide support portion assuming that the contact portion is out of contact from the guide portion; and wherein the arcuate path of the contact portion intersects the guide portion at an intersecting point assuming that the contact portion is contactable with the guide portion, a tangential line of the path at the intersecting point being defined, and wherein the guide portion has a guide surface configured to intersect the tangential line at a non-orthogonal angle.

* * * * *